United States Patent [19]
Sadler et al.

[11] 3,861,625
[45] Jan. 21, 1975

[54] EJECTED PILOT STABILIZING, RETARDING, SEPARATING AND PARACHUTE DEPLOYMENT SUB-SYSTEM

[75] Inventors: Robert F. Sadler, Phoenix; Harold G. Watson, Scottsdale, both of Ariz.

[73] Assignee: Universal Propulsion Co., Tempe, Ariz.

[22] Filed: Apr. 2, 1971

[21] Appl. No.: 130,594

[52] U.S. Cl. .................... 244/122 AB, 244/122 AD
[51] Int. Cl. ............................................. B64d 25/10
[58] Field of Search... 244/122 A, 122 AB, 122 AC, 244/122 AD, 122 AE, 122 AH, 138 R, 141

[56] References Cited
UNITED STATES PATENTS

| | | | |
|---|---|---|---|
| 2,527,020 | 10/1950 | Martin | 244/141 X |
| 2,931,598 | 4/1960 | Sanctuary | 244/122 AD |
| 3,020,011 | 2/1962 | Beem et al. | 244/122 AE X |
| 3,355,127 | 11/1967 | Stanley et al. | 244/122 AD |
| 3,356,320 | 12/1967 | Webb | 244/122 AH |
| 3,421,720 | 1/1969 | MacDonald et al. | 244/122 R |
| 3,442,473 | 5/1969 | Rivedal et al. | 244/122 AB |
| 3,726,499 | 4/1973 | Stencel | 244/122 AD |

*Primary Examiner*—Trygve M. Blix
*Assistant Examiner*—Barry L. Kelmachter
*Attorney, Agent, or Firm*—Ellsworth R. Roston

[57] ABSTRACT

As the pilot and his seat are ejected from the cockpit of a high speed aircraft by a rail-rocket or other ejection apparatus, the movement of the seat carries with it a rocket-motor type propulsion unit which is connected by a flexible cable to the seat. The rocket-motor propulsion unit, upon ejection from the aircraft with the seat is then triggered, preferably by a lanyard connected to the cockpit, and provides a thrust in a predetermined direction, as, for example, transversely to the direction of movement of the seat upon ejection and in opposition to the continued forward movement of the pilot. The rocket-motor is powered by the ignition of solid propellants, and by design, develops a spiralling action. By means of at least three flexible elements comprising a bridle connected between the pilot's seat and a swivel trailingly attached to the rocket-motor, the latter provides both stabilization and retardation of the velocity of the ejected seat with its pilot. When the pilot and seat combination has been slowed to an acceptable velocity and following a predetermined elasped time, release of pilot restraints enables the pilot to release and separate himself from the seat. In one embodiment of the invention, the rocket-motor propulsion unit is connected through the seat by a disconnect mechanism to the pilot's chute pack, first to stabilize and retard the pilot and his seat and then to deflect the pilot himself from his seat and open the pilot's drogue and main chutes. In an alternative embodiment, the seat is deflected and pulled away from the pilot and automatically to initiate chute deployment.

12 Claims, 13 Drawing Figures

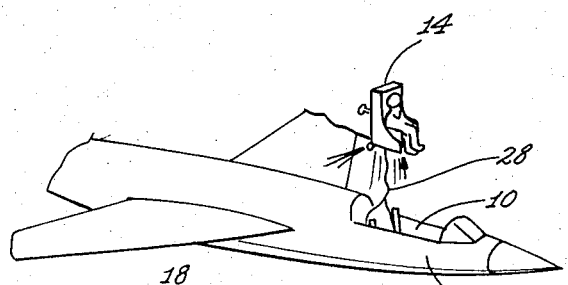
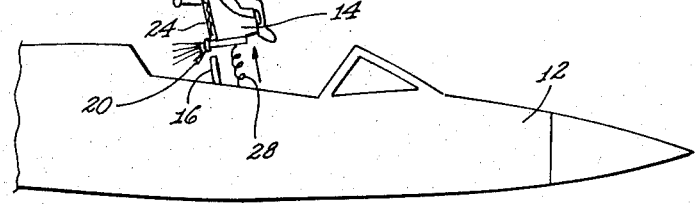
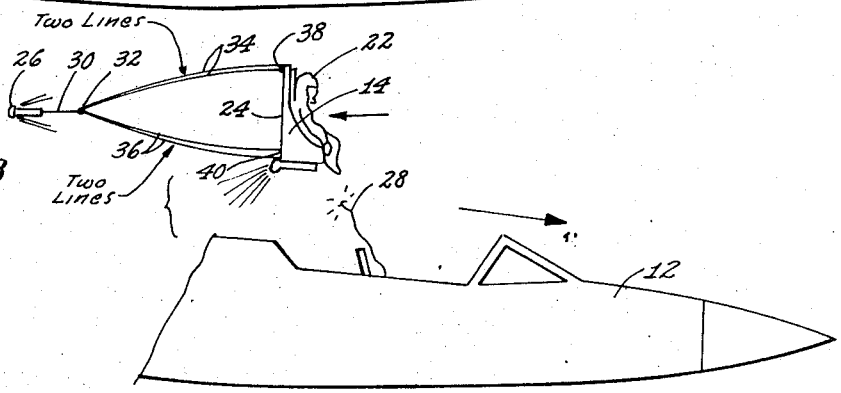
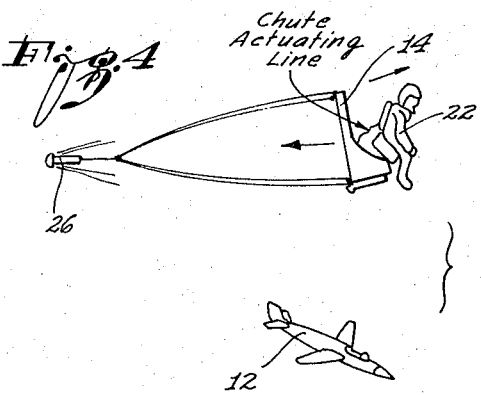
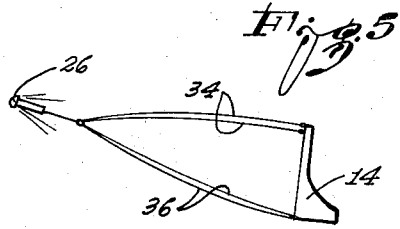

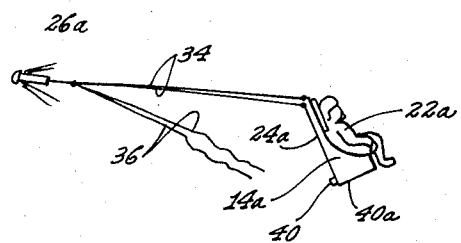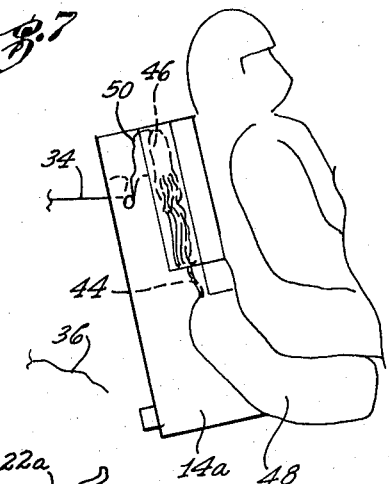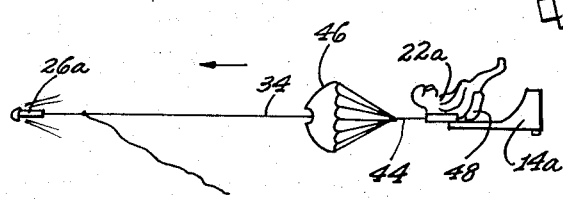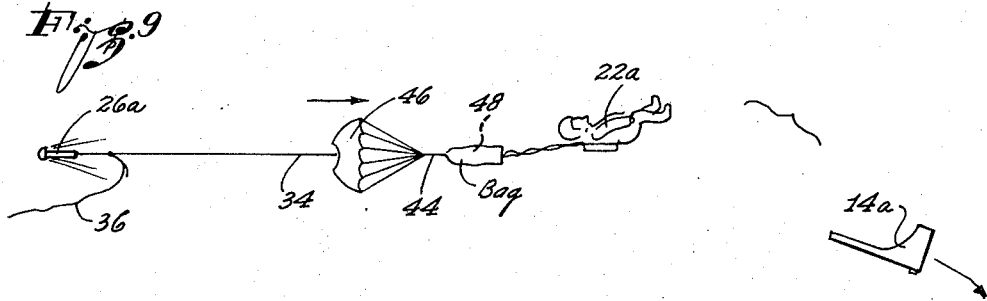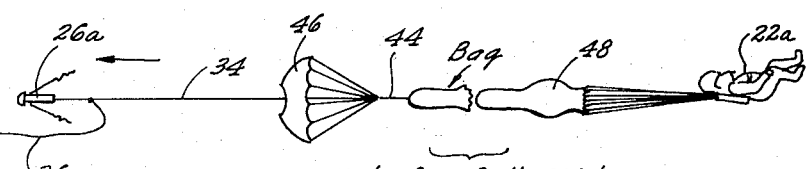

INVENTORS:
Robert F. Sadler
Harold G. Watson

ATTORNEYS

EJECTED PILOT STABILIZING, RETARDING, SEPARATING AND PARACHUTE DEPLOYMENT SUB-SYSTEM

BACKGROUND OF THE INVENTION

1. Field of the Invention

The present invention relates to subsystems utilizable in systems for ejecting a pilot from his aircraft under emergency conditions when the aircraft has been disabled and it appears probable that it will crash with loss of life, or serious injury to the pilot. Such conditions may particularly occur in the course of military action, but they could also occur following a collision or because of loss of some vital part or other disabling of the aircraft.

2. Description of the Prior Art

Various systems have heretofore been devised for ejecting a pilot from his aircraft when emergencies occur and it becomes desirable for the pilot to abandon his plane.

Initial systems involved the use of mechanical, compressed air, explosive devices or rocket motors, the function of which was to catapult the pilot and/or his seat from the cockpit. More recently devised systems have utilized tractor rockets which, either alone or with the air of some catapulting mechanism, pull the pilot and/or his seat from the cockpit and deploy his parachute. Examples of such more recent systems may be seen in the following U.S. Pat. Nos.:

| | |
|---|---|
| 3,355,127 | Stanley et al |
| 3,436,037 | Stanley |
| 3,424,409 | Stanley |
| 3,442,473 | Revedal et al |

The majority of personnel escape systems currently in service use separate subsystems to achieve seat/man stability, seat/man deceleration, and seat/man separation. Due to the complexity, weight and space required to accommodate three separate subsystems or the non-availability of adequate subsystems, many of the current personnel escape systems incorporate limited, separate stabilization or seat/man separation capability only. In general, this compromises system performance. Current in-service escape systems, for the most part, present an evolutionary process of added subsystems and modifications to counter problems as they have developed. This approach was necessitated by the high costs of developing and qualifying a complete new system each time a new problem developed. As a consequence many of today's systems are heavy and complex, or lack some of the subsystems and refinements necessary to provide safe, reliable escape under a wide range of conditions.

Subsystems have been evolved to provide either seat/man separation, seat/man stabilization, or seat/man retardation. Seat/man separation subsystems were evolved to alleviate the problem of seat/man and seat/parachute interferences. Generally, such subsystems either pull the pilot from the seat with his personnel chute or forcibly push the seat away from the man by inflating bladders between the man and seat or by pulling taut a length of webbing between the man and seat. Such systems lose a great deal of their effectiveness at low speeds and under conditions where the seat/man mass turn around so that the seat is ahead of the man. A more recently developed subsystem uses a long lanyard to snub the seat at seat ejection sustainer rocket burnout. The effectiveness of this system is a function of many variables and the long lanyards necessary to snub the seat at the end of rocket burnout create unique problems for the multi-place aircraft. Another system would use the rocket-motor to push the seat laterally out of the man/chute trajectory.

Seat/man stabilization subsystem were evolved to counter pitching and yawing moments created by aerodynamics and by sustainer rocket thrust line/center of gravity eccentricities. Several methods have been developed, including aerodynamic booms, drogue chutes, friction brake units, and gyro controlled vernier rockets. The boom and drogue chute subsystem's effectiveness is a function of airspeed. Hence, at low airspeeds the booms are ineffective and the drogue chute is slow in deployment and low in effectiveness. The friction brake subsystem is effective over the entire speed range; however, because of the nature of the system it has no correcting effect on yawing moments and, because of limited line length, it is difficult to provide pitching stabilization for the entire rocket burn time and no stabilization for aerodynamic moments after lanyard release. In addition, due to the lanyard pulling downward on the seat, a fixed amount of impulse is subtracted from the system possibly affecting its low level and high sink rate recovery capability. A later development for stabilization is the gyro controlled vernier rocket. This subsystem is effective over the speed range and adds impulse to the system; however, it is relatively heavy, expensive, has no effect on yawing moments, and does not provide stabilization following rocket burn-out.

Seat/man retardation subsystems were developed to decrease the time from a maximum speed ejection to a speed safe for parachute deployment. Many systems rely entirely upon the aerodynamic drag of the seat/man mass to achieve this, while others have incorporated a deceleration drogue chute.

Hence, of the many varied subsystems that have been evolved, some are completely effective for one of the desired system requirements, while others are only partially effective. Without exception these subsystems achieve their functions by applying controlled forces directly or through moment generating bridle arrangements to the seat/man mass.

And of all the subsystem configurations discussed, only the drogue chute has the capability of providing seat/man stability in both the pitch and yaw planes, seat/man retardation, and seat/man separation. However, this capability is significantly reduced under low airspeed conditions and requires excessive time for deployment. Thus, the need for a single, lightweight, inexpensive force generating subsystem which is unaffected by airspeed and which will provide all three of these functions is apparent.

SUMMARY OF THE INVENTION

The present invention comprises, for use with a seat ejection system, a single, lightweight, inexpensive force generating subsystem, which is unaffected by airspeed and provides initially seat/man stability in both pitch and yaw planes, and seat/man retardation and, finally seat/man separation.

In essence, the subsystem of the present invention may be employed with a seat ejection system such as one having a first propulsion unit which serves to drive the pilot's seat (and the pilot himself) up and off at least one rail in a conventional manner, and includes a second propulsion unit, preferably in the form of a tractor rocket, which is connected by a multipoint bridle to the seat back. This tractor rocket may be fired by the tautening of a lanyard attached to the cockpit as the seat is shot off the rail by the first propulsion unit. Upon firing, the tractor rocket preferably moves in a direction opposite the direction of the seat/plane inertia. In this disposition, thrust of the rocket, which by its construction will spin to produce a gyroscopic effect, provides seat/man retardation up to the time of seat/man release and either man or seat retardation from the release to rocket burn-out. This force is initially converted into two separate moments by the bridle arrangement; one moment is in the seat/man pitch plane and the other is in the seat/man yaw plane. In each case the moment generated is in opposition to and of equal magnitude to any moment from the seat/man mass up to the maximum moment determined by the bridle geometry and the rocket thrust.

The configuration illustrated in the accompanying drawing is preferred over one with the tractor rocket trailing below the seat for four reasons:

1. It provides yaw stabilization;
2. It provides retardation of the seat/man mass in the "eyeballs out" direction;
3. The moment arm of the bridle is greater; hence corrective moment in the pitch plane is more;
4. Adverse aerodynamic effects on the system are reduced or eliminated.

BRIEF DESCRIPTION OF THE DRAWINGS

FIG. 1 is a perspective view illustrating the ejection upward and initial deployment of the seat and its occupying pilot.

FIG. 2 is an enlarged partial side elevation of the ejection shown in FIG. 1.

FIG. 3 is a similar elevation to that of FIG. 2, but showing what transpires after the tractor rocket of the subsystem of the present invention is ignited.

FIGS. 4 and 5 illustrate what thereafter happens to both the pilot and the ejected seat in the embodiment where the pilot is directly released from the seat.

FIGS. 6 through 11 inclusive illustrate another form of the invention in which one line of the bridle is attached to the pilot's parachute pack after release of the other lines from the seat, and the manner in which the seat and pilot are thereby separated after ejection from the aircraft in the manner shown in FIGS. 1, 2 and 3.

DESCRIPTION OF THE PREFERRED EMBODIMENT

Figure 12:
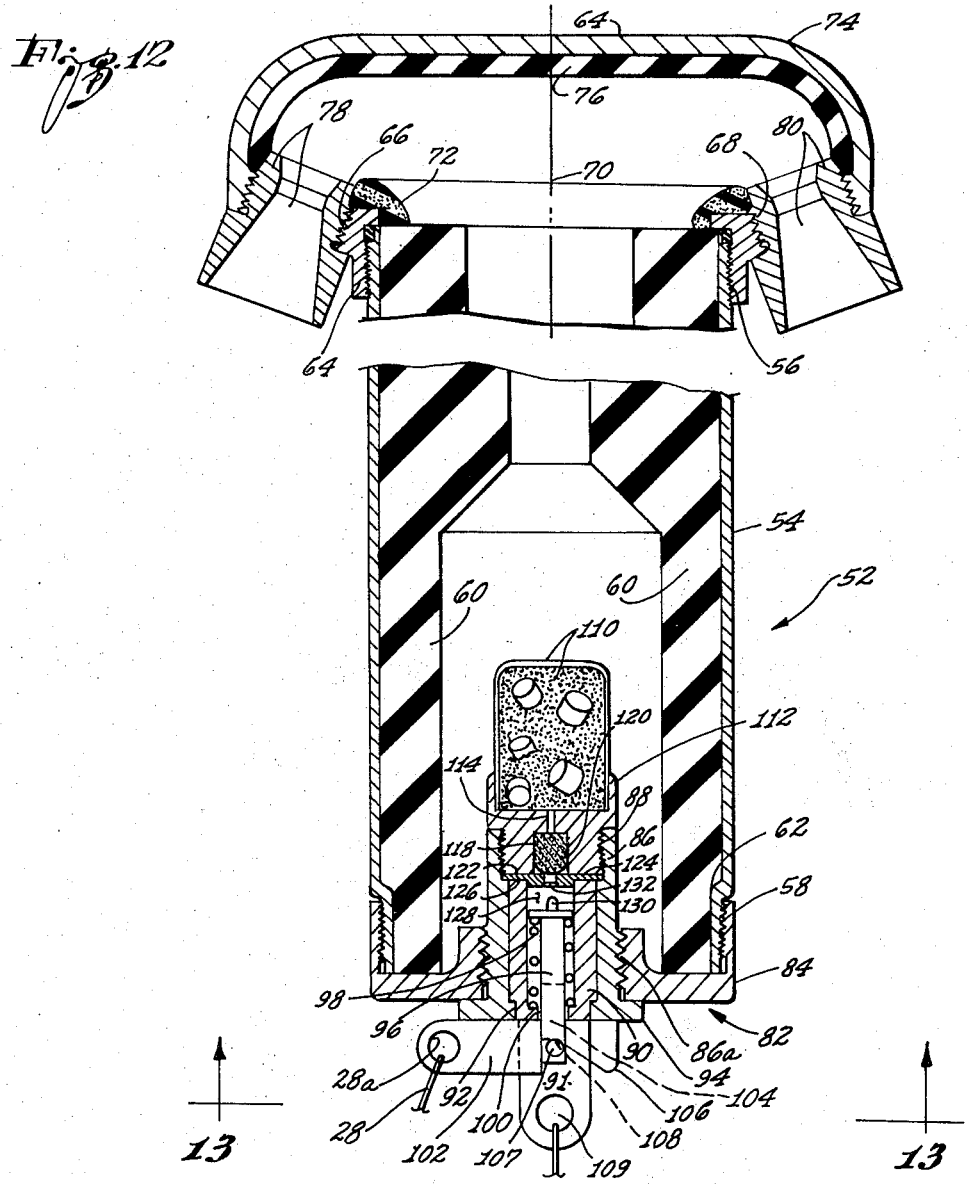
FIG. 12 is a sectional view of a preferred form of the tractor rocket propulsion unit.

The subsystem of the present invention may be employed in a seat ejection system such as that illustrated in FIGS. 1 and 2 of the drawings wherein there is shown a cockpit 10 in an aircraft 12, from which the canopy (not shown) has been removed. Disposed in the cockpit 10 is a seat 14, which is slidably and releasably secured to an upwardly projecting rail 16. Provision is made within the aircraft for developing a catapulting force against the seat 14 in the direction of the arrow 18. This catapulting force could be developed by any conventional means such as compressed gas, rocket or a mechanical spring (not shown). In the embodiment here illustrated, a propulsion rocket 20 is provided to develop the necessary force to drive the seat and the pilot occupying the same in the direction of the arrow 18 and off the rail 16. Within the aircraft, preferably within easy reach of the pilot 22, is a triggering device (not shown) to fire the propulsion rocket 20. The propulsion rocket 20 is not shown in detail since it is well known in the art as may be seen from U.S. Pat. No. 3,442,473 issued to John C. Rivedal and Gordon A. Valentine on May 6, 1969.

Figure 13:
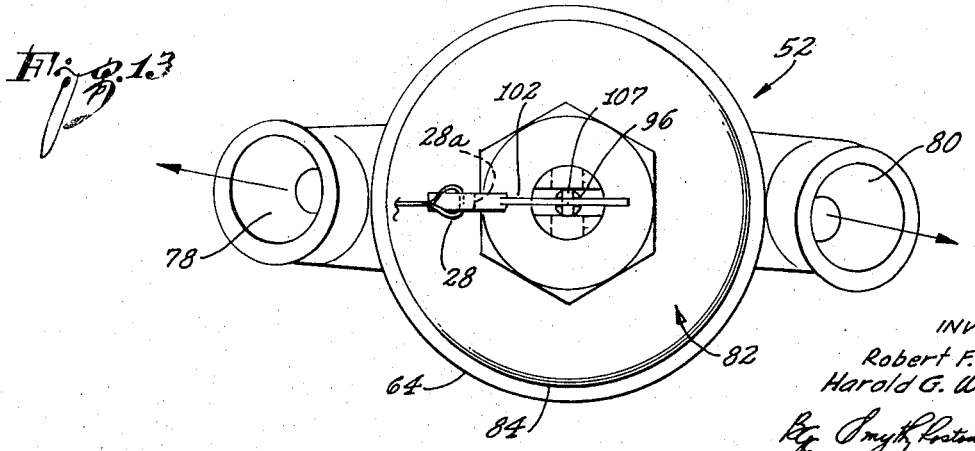
FIG. 13 is a bottom view as seen in the direction of the lines 13 — 13 of FIG. 12.

Considering specifically the subsystem of the present invention when employed with such a seat ejection system, a tractor rocket 26 is detachably secured to the bottom, side or back 24 of the seat 14. A lanyard 28 is connected to the end 28a of the cam triggering bar 102 (FIGS. 12 and 13). This lanyard 28 may be secured to a fixed point within the cockpit 10 and is of such length that it pulls taut and triggers the tractor rocket 26 just as the seat 14 passes off the end of the catapult rail 16. This is disclosed in detail subsequently in connection with the detailed construction of the tractor rocket 26 in FIGS. 12 and 13. As soon as the rocket 26 is ignited, it moves away from the back 24 of the seat 14 (as shown in FIG. 3), but is secured thereto by a cable 30 which terminates in a multiline swivel 32. A bridle in the form of at least three, and preferably two pairs of cords 34 and 36 is provided, the cords of each of which pairs are spaced from each other and are secured at points 38, 38a and 40, 40a on the top and bottom respectively of the back 24 of the seat 14. As the rocket 26 thus moves away from the back 24 of the seat 14, it spins and first assumes the position shown in FIG. 3. The spinning of the rocket is also described in detail subsequently in connection with the detailed construction of the rocket motor as shown in FIGS. 12 and 13. In this disposition the rocket 26 serves to draw the seat 14 rearwardly to decelerate it while simultaneously providing stabilization to the seat 14 and pilot 22. This dual function of stabilization and deceleration may continue at least until after burn-out of the propulsion rocket 20. After deceleration has occurred the pilot may be released from his seat as shown in FIG. 4. With such release the chute actuating line 44 will be pulled to release the chute 46 after the pilot has dropped below 15,000 inches. The release of the pilot from the seat may be obtained by the operation of apparatus such as shown and described in detail in U.S. Pat. No. 3,356,320 issued to Earl W. Mussett on Dec. 5, 1967.

In the other embodiment shown in FIGS. 6 through 11, the ejection of the seat 14a off the rail 16 is accomplished in an identical manner to that of the embodiment of FIGS. 1, 2 and 3. The tractor rocket 26a (corresponding to the tractor rocket 26 in the embodiment shown in FIGS. 1 to 6, inclusive) is similarly connected by a multipoint bridle in the manner shown in FIG. 3 except that the flexible lines 34 are connected by a line 50 to a drogue parachute 46. The drogue parachute is normally disposed in a folded or collapsed condition and is connected by a line or lines 44 to a parachute pack or bag 47. A main parachute 48 is normally disposed within the parachute pack or bag. However, after a predetermined time lapse, the lower bridle cords 36 are released from the points 40, 40a by apparatus such as disclosed in column 12, lines 5 to 49, inclusive, of Rivedale, et al U.S. Pat. No. 3,422,473. The release of the bridle cords 36 from the points 40, 40a causes the seat 14a with occupying pilot 22a to swing into the position shown in FIG. 6 because of the continuing force provided on the pilot and the seat by the rocket 26 through the lines 34. When this occurs the upper cords 34 are also released from points 38, 38a, but at least one cord 34 is further connected in the manner decribed above to open the pilot's drogue parachute 46 when the line or lines 34a become taut and cause the line 50 to become taut. Should this occur above 15,000 inches, the line 34 is released from a continuing line 44 to the bag 47 and the seat/man combination descends to 15,000 inches where the the line 44 and the bag 47 are released from the main parachute 48. Should the drogue parachute 46 be deployed below 15,000 inches, the line 34 remains connected to line 44 such that the bag 47 becomes pulled away from the main parachute 48 and causes the pilot's main parachute 48 to open and simultaneously pull the pilot 22a away from the seat 14a because of the drag provided by the main parachute.

Although the subsystem of the present invention may employ any type of force generating device to drive the pilot's seat (and pilot) up and off the rail or rails on which his seat is slidably mounted, and any kind of suitable tractor rocket motor for developing the desired deflecting force after ejection of the pilot and his seat from the cockpit, as for example, any of the rocket motors disclosed in the prior art patents hereinabove referred to, there is illustrated in FIGS. 12 and 13 a preferred type of rocket motor 52 for the tractor propulsion unit contemplated in the present inventive subsystem.

Referring specifically to FIGS. 12 and 13, the tractor rocket motor 52 is comprised of a cylindrical shell 54 fabricated of high strength alloy steel to provide a high strength-to-weight ratio, but yet ease of manufacture. Each end of the shell 54 is externally threaded at 56 and 58. Disposed in shell 54 is a solid propellant motor grain 60 which preferably may be a carboxy-terminated polybutadiene-high density oxidizer propellant. This propellant 60 has about twice the density of conventional propellants and thus decreases the requisite size of this motor. The propellant 60 may either be cast into the shell 54, or pre-cast to the internal configuration of the shell and then slipped into the latter. The annular shoulder 62 serves to properly seat the propellant within the shell 54. Threaded on to the upper end of the shell 54 is a nozzle cap 64 which has two rearwardly directed threaded orifices 66 and 68, each of which orifices is slightly canted with respect to the axis 70 of the shell 54. An annular fire resistant fibrous gasket 72 is provided to insulate the metal of the ring and cap from the propellant 60. The cap portion 74 of the ring and cap 64 desirably are also lined with a fire resistant material 76. Nozzles 78, 80 are threaded into the orifices 66, 68 respectively.

The opposite end of the shell 54 receives, through threaded engagement on threading 58, the firing mechanism and the igniter assembly 82. This assembly includes an annular mounting ring 84 with a threaded bore 86 which receives a tubular stud 86a. This stud 86a is internally threaded at 88. In assembling the firing mechanism and igniter assembly 82, a tubular firing pin housing 90 is passed through the orifice 92 in the head 94 of the stud 86a and the firing pin 96 about which the spring 98 is coiled, is dropped through the orifice 100 and secured against retraction therefrom by passing the cam trigerring bar 102 through the slot 104 in the firing pin 96 to where the pin 107 in the firing pin 96 passes over the high point 106 and down into the valley 108 of the cam bar 102. To accomplish this, it is necessary to push the firing pin 96 downwardly against the spring 98 until the pin 107 clears the high point 106 and can come to rest in the valley 108, whereupon the firing pin is returned to the position shown in FIG. 13. It will be noted that the lower end 91 of the housing 90 is transversely orificed to receive the end of a tow cable or bridle 30 (FIG. 3).

The propellant firing cartridge 110 is mounted by a housing 112 which is screwed into the threading 88 of the stud 86a. This housing is centrally bored at 114 and counterbored at 118. The igniting cap 120 is disposed in counterbore 118 and is supported there by a metal washer or diaphragm 122 interposed between the end wall 124 of the housing 112 and the end wall 126 of the firing pin housing 90.

In operation, when the lanyard 28 is tightened, it will pull the cam triggering bar laterally. The pin 107 is caused to ride up onto the peak 106 of the bar 102 until it passes over the peak 106 and is freed, whereupon the firing pin 96 is snapped into the passageway 128 by the urging of the spring 98 so that the tip 130 of the firing pin strikes the base 132 of the cap to set it off. The firing of the cap 120 causes a discharge through the bore 114 to ignite the cartridge 110 which, in turn, ignites the propellant 60. As the latter burns, discharge occurs through the nozzles 78, 80 which, because of their canting, impart a spin to the rocket as it is driven oppositely from the nozzle discharges.

The tractor rocket motor 52 is intended for a typical high speed ejection system capability and may be designed to provide a total impulse of 700 lb.-sec. Approximately 60% of the total energy should be imparted in the initial portion of the firing. A rocket motor of such design characteristics will provide deployment and seat stabilization as soon as the seat/mass separates from the rail or rails and during the burn time of the rocket catapult sustainer thrust, or approximately 0.45 seconds. Desirably the rocket motor should decay in thrust between 0.30 and 0.50 seconds and level off to provide a continuing low thrust for an additional 1.20 seconds. The overall burn time of the rocket motor of 1.70 seconds will assure that seat/man release has occurred and the man pulled from the seat, or vice-versa to provide adequate clearance.

The grain configuration desirably should consist of a combination star point and a cylindrical perforation geometry. The star point will provide the necessary initial burning surface area to impart the desired thrust level during the first 0.30 sec. of burning and tail off. The cylindrical perforation of the grain will then provide the low energy sustaining thrust over the remaining 1.20 sec. of operation.

Achieving such functional specifications for the rocket motor may readily be accomplished by any person skilled in the art of designing and fabricating rocket motors, particularly those of the type disclosed in the prior art patents listed hereinabove. Therefore, and since the rocket motor herein illustrated and described is not per se claimed as inventive, but only as one type of propulsion means which may be employed in the subsystem which is so claimed, further design details of the rocket motor which is so suggested as such propulsion means need not be, and are not provided herein.

The subsystem for use with a pilot ejection system which subsystem has been illustrated and described will be found greatly to improve the chances of successfully recovering, and improve the ejection trajectory of pilots whose aircraft become disabled to the point where they cannot be safely landed, or the risk of an unsafe landing becomes too great.

We claim:

1. In a system for ejecting from an aircraft a pilot with his parachute pack and a seat releasably occupied by him in the aircraft where said system includes means to catapult the seat and pilot upwardly and outwardly through an opening in a fuselage in the aircraft, a subsystem initially to stabilize and decelerate the seat and the pilot and after a predetermined interval to effect separation of the seat and pilot and the opening of parachutes from a chute pack on the pilot, said subsystem comprising:

A. a tractor rocket, said rocket
  i. being disposed in association with the seat in the aircraft for removal from the seat and actuation from the seat in a direction opposite to the direction of movement of the aircraft, the tractor rocket being disposed in a relationship substantially perpendicular to the catapult means during the operation of the tractor rocket and having a major component in a horizontal direction during the operation of the tractor rocket;
  ii. when removed with the seat from the aircraft and actuated, developing a predetermined quantum of thrust in a direction opposite to the direction in which the aircraft is moving;
  iii. developing a spin relative to the pilot and the seat for gyroscopic control; and
  iv. having a trailing element terminating in a swivel device constructed rotatably to receive the ends of a plurality of flexible lines and to develop the spin for gyroscopic control;
B. a multipoint bridle arrangement, said arrangement comprising at least three flexible lines, each of said lines extending between
  i. a preselected releasable connection disposed on a particular one of the seat and the chute pack and spaced from the other connections of the flexible lines with at least two of said connections being disposed at different elevations, and
  ii. the said swivel device;
C. triggering means to actuate the tractor rocket after the seat and the pilot have been catapulted upwardly and outwardly through said opening in the aircraft fuselage; and
D. means responsive to the actuation of the tractor rocket to provide the release of the pilot from the seat after the actuation of the tractor rocket and thereafter deploying the parachute from the pilot's chute pack.

2. In a system for ejecting from an aircraft a pilot with his parachute pack and the seat releasably occupied by him in the aircraft where said system includes means to catapult the seat and pilot upwardly and outwardly through an opening in the aircraft fuselage, a subsystem initially to stabilize and decelerate the seat and the pilot and after a predetermined interval to effect separation of the seat and pilot and the opening of parachutes from a chute pack on the pilot, said subsystem comprising:

A. a tractor rocket, said rocket
  i. being disposed in association with the seat in the aircraft for removal from the seat and actuation from the seat in a direction opposite to the direction of movement of the aircraft, the tractor rocket being disposed in a relationship substantially prependicular to the catapult means during the operation of the tractor rocket and having a major component in a horizontal direction during the operation of the tractor rocket;
  ii. when removed with the seat from the aircraft and actuated, developing a predetermined quantum of thrust in a direction opposite to the direction in which the aircraft is moving;
  iii. developing a spin relative to the pilot and the seat for gyroscopic control; and
  iv. having a trailing element terminating in a swivel device constructed rotatably to receive the ends of a plurality of flexible lines and to develop the spin for gyroscopic control;
B. a multipoint bridle arrangement, said arrangement comprising at least three flexible lines, each of said lines extending between
  i. a preselected point of attachment on the seat and spaced from the other points of attachment of the flexible lines with at least two of said points being at different elevations on the seat; and
  ii. the said swivel device;
C. triggering means to actuate the tractor rocket after the seat and the pilot have been catapulted upwardly and outwardly through said opening in the aircraft fuselage; and
D. means operative after the actuation of the tractor rocket to provide the release of the pilot from the seat and to initiate depolyment of the parachute from the chute pack when the pilot shall have dropped below a predetermined altitude above the ground.

3. In a system for ejecting, from the cockpit of an aircraft, a pilot with his parachute pack and a seat releasably occupied by the pilot in the aircraft, the parachute pack including a parachute,
  first means including a propulsion rocket for initially catapulting the pilot and the seat upwardly from the cockpit,
  a tractor rocket disposed on said seat substantially perpendicular to said catapult means during the operation of said tractor rocket and releasably attached to the seat, in a relationship to the seat with a major component in the horizontal direction during the operation of the tractor rocket, to propel the seat and the pilot in a rearward direction from the aircraft for decelerating the seat and the pilot relative to the aircraft,
  second means responsive to the catapulting by the first means of the pilot and the seat upwardly from the cockpit for a particular distance to energize the tractor motor, and
  third means operatively coupling the tractor rocket to the seat for stabilizing the seat and the pilot during the operation of the tractor rocket in decelerating the seat and the pilot.

4. In the system set forth in claim 3,
  the third means providing a spinning of the rocket motor during the operation of the tractor rocket in decelerating the seat and the pilot.

5. In the system set forth in claim 3, the third means including fourth means attached to the seat at a plurality of spaced positions on the seat for facilitating the stabilizing of the seat and the pilot during the operation of the tractor rocket in decelerating the seat and the pilot.

6. In a system as set forth in claim 5,
the third means providing a spinning of the tractor rocket during the operation of the tractor rocket in decelerating the seat and the pilot and the fourth means having flexible properties to be stored against the seat before the energizing of the tractor rocket and to provide for a movement of the tractor rocket from the seat upon an energizing of the tractor rocket.

7. In a system as set forth in claim 5,
the fourth means including a first pair of means attached to the seat at a first height on the seat and at laterally spaced positions on the seat and a second pair of means attached to a particular one of the parachute pack and the seat at a second height and at laterally spaced positions.

8. In a system as set forth in claim 7,
the first pair of said fourth means being capable of becoming disconnected from the seat to provide for a pivoting of the seat to a disposition with the pilot in a reclining position and the second pair of said fourth means being attached to the parachute pack to provide for a removal of the parachute from the parachute pack and a deployment of the parachute after removal of the parachute from the parachute pack.

9. In a system for ejecting from the cockpit of an aircraft a pilot with his parachute pack and a seat releasably occupied by the pilot in the aircraft,
first means including a propulsion rocket for initially catapulting the pilot and the seat upwardly from the cockpit,
a tractor rocket disposed on said seat substantially perpendicular to said catapult means during the operation of said tractor rocket and releasably attached to the seat, in a relationship to the seat with a major component in the horizontal direction during the operation of the tractor rocket, to propel the seat and the rocket in a rearward direction from the aircraft for decelerating the seat and the pilot relative to the aircraft,
second means responsive to the catapulting of the tractor rocket from the cockpit by the first means for providing for an energizing of the tractor rocket,
third means operatively coupled between the tractor rocket and the seat for stabilizing the movement of the seat and the pilot during the deceleration of the seat and the pilot by the operation of the tractor rocket, and
fourth means for providing for the release of the pilot from the seat after the tractor rocket has become energized to decelerate the seat and the pillot relative to the aircraft.

10. In a system as set forth in claim 9 wherein
the fourth means includes means for initially providing for a tilting of the seat to a reclining position of the pilot in the seat before the pilot becomes released from the seat.

11. In a system as set forth in claim 9,
wherein the third means includes a plurality of flexible lines coupled at one end to the tractor rocket and at the other end to a particular one of the parachute pack and the seat at spaced positions relative to one another.

12. In a system as set forth in claim 9,
wherein the third means includes a plurality of flexible lines coupled at one end to the tractor rocket and at the other end to the seat at a pair of laterally spaced positions at a first height on the seat and to the parachute pack at a second pair of laterally spaced positions at a second height different from the first height and wherein the fourth means includes means for initially providing for a disconnection between the flexible lines and the seat at the first height to provide for the tilting of the seat to the reclining position of the seat.

* * * * *